United States Patent
Hitzeman

(10) Patent No.: US 6,760,312 B1
(45) Date of Patent: Jul. 6, 2004

(54) QUALITY OF SERVICE ON DEMAND

(75) Inventor: Bonnie P. Hitzeman, Wheaton, IL (US)

(73) Assignee: Lucent Technologies Inc., Murray Hill, NJ (US)

(*) Notice: Subject to any disclaimer, the term of this patent is extended or adjusted under 35 U.S.C. 154(b) by 0 days.

(21) Appl. No.: 09/451,327

(22) Filed: Nov. 30, 1999

(51) Int. Cl.[7] .............................................. H04L 12/26
(52) U.S. Cl. ...................... 370/252; 370/230; 709/223; 379/142.01
(58) Field of Search ................................ 370/252, 253, 370/229, 230, 231–235, 238, 352, 353, 356, 389, 395.1, 396, 395.2, 395.21, 395.4, 395.41, 395.5, 395.52, 400, 401, 437, 465–469, 477; 379/93.01, 93.02, 93.03, 142.01, 900; 709/223–226, 228–230, 240

(56) References Cited

U.S. PATENT DOCUMENTS

| | | | | |
|---|---|---|---|---|
| 5,099,511 A | * | 3/1992 | Matsumoto | 379/198 |
| 5,745,480 A | | 4/1998 | Behtash et al. | 370/252 |
| 5,898,668 A | * | 4/1999 | Shaffer | 370/230 |
| 5,999,598 A | * | 12/1999 | Henrick et al. | 379/93.07 |
| 6,021,439 A | * | 2/2000 | Turek et al. | 709/224 |
| 6,292,566 B1 | * | 9/2001 | Reeves et al. | 379/142.01 |
| 6,421,350 B1 | * | 7/2002 | Szurkowski et al. | 370/419 |
| 6,519,595 B1 | * | 2/2003 | Rose | 707/10 |
| 6,549,938 B1 | * | 4/2003 | Kilkki et al. | 709/207 |

FOREIGN PATENT DOCUMENTS

| | | |
|---|---|---|
| EP | 0817452 A | 1/1998 |
| EP | 0910200 A | 4/1999 |

* cited by examiner

*Primary Examiner*—Brian Nguyen

(57) ABSTRACT

A method is presented for efficiently utilizing network resources while routing voice communications over a packet-based data network with specified minimum quality of service requirements, where greater network resources are required to ensure higher quality of service parameters. A dial code can be entered by a user to specify an appropriate quality of service. If the dial code is valid, the call is routed with the specified quality of service. If the dial code is not valid, the call is routed with default minimum quality of service parameters. Also, a line may be associated with overriding minimum quality of service parameters, whereby all calls directed to such a line are automatically upgraded, if necessary, to conform to the overriding minimum quality of service parameters.

9 Claims, 2 Drawing Sheets

QUALITY OF SERVICE ON DEMAND

BACKGROUND OF THE INVENTION

1. Field of the Invention

This invention relates in general to advanced telephony services. In particular, the invention relates to a method for controlling the quality of service of a telephone call routed over an IP-based network.

2. Background Art

Recent years have witnessed a rapid convergence of voice, video, and data communications. Communication service providers have begun developing intelligent networks capable of seamlessly handling a multitude of data types. At the heart of such networks are advanced communication switches, such as the Lucent 5ESS, which are highly configurable and can support a variety of communications functions.

Traditionally, voice communications have been conducted over switched circuit networks with fixed, dedicated channels, whereby each active call has a predetermined bandwidth assigned exclusively thereto. Consequently, voice communications over such networks have been characterized by highly stable and reliable connections, with highly consistent sound quality—attributes that users have often learned to expect.

By contrast, data communications are often conducted over packet-based networks, such as those based on the Internet Protocol ("IP"). Large numbers of users can share a common IP-based network because each user occupies network bandwidth only while actively transmitting information. However, due to the predetermined finite bandwidth of the packet network and a lack of reserved bandwidth for any individual user, IP-based networks typically possess a generally inverse relationship between the number of users actively transmitting data, and the maximum bandwidth available to each user. As network traffic increases, performance for each user typically declines.

As voice and data communications converge onto common networks, substantial advantages can be realized by routing voice communications over IP-based networks that have traditionally been used for data. The increased efficiency of an IP-based network will likely result in reduced infrastructure costs for a communications service provider, and accordingly may result in reduced cost to end users. Service providers who maintain multiple networks for different services may converge their services to one packet network, thereby potentially reducing the cost of network expansion and maintenance. Furthermore, corporations or other users who have multiple locations that are already connected by high-speed Wide Area Network ("WAN") data connections can leverage the existing data infrastructure to also route voice traffic over the WAN, thereby saving the cost of access fees otherwise incurred in routing calls over the public interexchange carrier network.

However, one challenge imposed by the routing of voice over packet-based data networks is ensuring a satisfactory Quality Of Service ("QOS") for the voice communication. QOS typically refers to one or more of the following parameters: bandwidth, latency, jitter, and/or loss. Because users do not have dedicated channels allotted on a conventional IP-based network, quality of service over such a network can substantially degrade when network traffic is high.

Numerous problems can arise for many applications, including without limitation voice, facsimile transmission, or streaming video, when QOS is not controlled. Customers can become dissatisfied by a failure to maintain their expectations of highly stable and reliable service, and highly consistent sound quality, which expectations have been developed through years of using conventional switched circuit telecommunication systems. Moreover, many modern automated systems, such as voice mail and other telephone-based information systems, rely on voice and/or touch-tone digit recognition for data entry, option selection, and other operations. Such digit and voice recognition systems may fail or malfunction in the face of intermittent cut-outs or poor audio quality that can occur during high traffic periods on a conventional prior art packet network.

In view of the desire for a guaranteed minimum QOS over a packet network for applications such as voice, several methods and protocols have been developed to maintain predetermined minimum quality of service levels. Using such methods and protocols, different communication links can be assigned various QOS guarantees, thereby permitting the use of a common efficient packet-based network for many types of communications, without sacrificing reliable QOS for QOS-sensitive applications.

However, as QOS requirements increase, the cost of the communication in terms of network resources increases also. Therefore, when all or part of a packet-based communication is routed over a third party network, a higher price is typically charged for higher guaranteed QOS parameters. Even when a call is routed entirely within a single company's network, there is a higher cost in terms of the company's network resources for calls with a higher guaranteed QOS. Yet typical prior art QOS models contemplate assigning predetermined static QOS guarantees to each line of a communications system, regardless of the QOS actually required for any particular call. Such a QOS allocation will commonly result in inefficiencies, whereby a company pays the cost to access a high QOS line when it is not necessary, and/or alternatively suffers complications due to using a low QOS line when a higher QOS line would be appropriate.

Therefore, it is desirable, and an object of this invention, to provide a system with which a user can efficiently allocate appropriate QOS guarantees for communications placed over a packet-based network. It is also an object of this invention to allow users to provide a QOS authorization code, with which the user may, if authorized, specify a QOS guarantee different from any default line value that is appropriate for a particular call.

Finally, some call recipients may require or desire a predetermined minimum QOS guarantee for calls received, regardless of the line originating the call. For example, a voice mail system with touch-tone menu operation may have a specific QOS level that is required for reliable digit recognition. Therefore, it would be desirable if all calls placed to such a voice mail system were automatically assigned a predetermined minimum QOS guarantee that is known to allow for reliable digit and/or voice recognition. Accordingly, it is an object of this invention to provide a destination line override feature, whereby a call's QOS can be automatically adjusted to guarantee predetermined QOS parameters corresponding to the line receiving the call.

SUMMARY OF THE INVENTION

The invention provides for the efficient allocation of network resources, when a packet network is utilized to route QOS-sensitive communications, such as voice, with specified quality of service parameters. Default quality of service parameters are assigned to a first telephone line on which a call is initiated. A dial code can then be received on the first telephone line. The dial code may include a security or personal identification sequence to restrict the specification of QOS parameters to desired users, and/or to log the use of specified QOS parameters. The dial code may also include a sequence which specifies one of a plurality of available quality of service levels.

A call is placed on the first line, directed to a second line. The applicable quality of service parameters for the call are then determined. If the QOS request code is valid, then the call is routed over the packet network with guaranteed quality of service parameters corresponding to the requested quality of service level. If the QOS request code is not valid, then the call is routed over the packet network with guaranteed quality of service parameters corresponding to the default quality of service level for the first telephone line. If sufficient network resources are not available to guarantee the requested quality of service level, the caller can choose to route the call at a lower quality of service level, or hold until the desired quality of service level becomes available.

Furthermore, a telephone line can be assigned override quality of service parameters, so that QOS-sensitive telephone users, such as voice mail systems that employ touch tone or voice recognition or individuals who demand high QOS, can ensure that all calls placed to them satisfy the override quality of service parameters. A call is initiated from a first telephone line, directed to a second telephone line, according to the quality of service level corresponding to the first line. The communications system determines that one or more of the first line quality of service parameters with which the call was initiated is of lesser quality that the level specified by the override parameters. The call is then routed between the first and second telephone lines with quality of service parameters equal to or better than the override quality of service parameters.

DETAILED DESCRIPTION OF THE DRAWINGS

Figure 1:
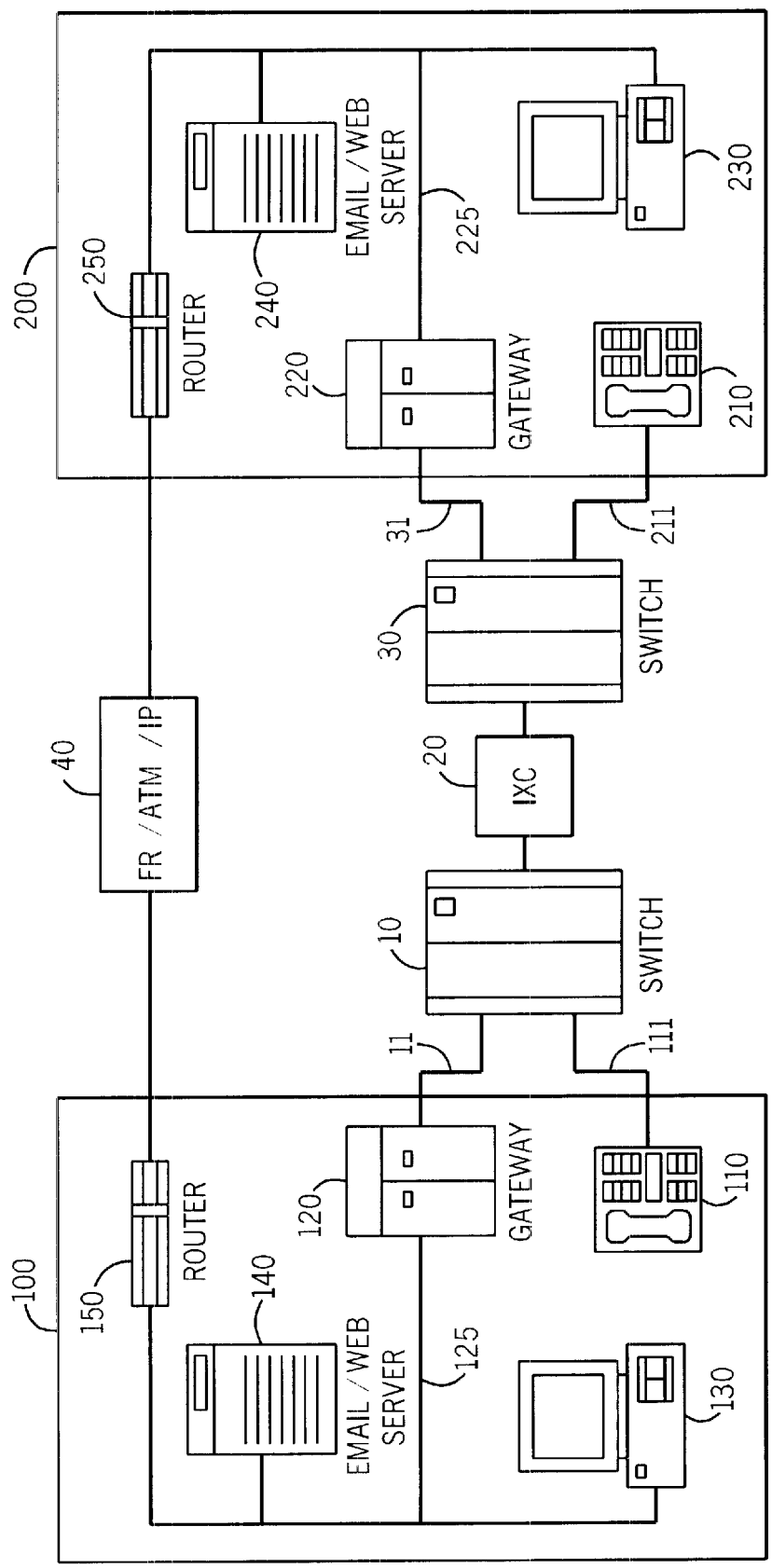
FIG. 1 is a block diagram of an embodiment of the invention involving two local area networks, between which telephone calls can be placed over an interconnecting packet network link.

While this invention is susceptible to embodiment in many different forms, there are shown in the drawings and will be described in detail herein several specific embodiments. The present disclosure is to be considered as an exemplification of the principle of the invention intended merely to explain and illustrate the invention, and is not intended to limit the invention in any way to embodiments illustrated. For example, while the specific embodiments of FIGS. 1 and 2 specifically involve telephonic voice communications, it is envisioned that other forms, including facsimile and data communications, are within the scope of this invention.

FIG. 1 depicts an embodiment of the invention that includes corporate office 100 and corporate office 200, the offices being interconnected by both circuit-switched telephone interexchange carrier 20, and packet-based network connection 40. Furthermore, corporate office 100 includes IP-based local area network 125, and office 200 includes IP-based local area network 225. In embodiments such as those of FIG. 1, in which multiple corporate offices are interconnected, packet-based network 40 will typically consist of a frame relay link, an asynchronous transfer mode ("ATM") link, or a high-speed IP link, such as a dedicated T1 line.

Under a conventional, switched circuit telephone system, if a user of telephone 110 places a call to telephone 210, the user dials the telephone number corresponding to line 211 onto telephone line 111, which may be comprised of a communications link such as an analog telephone line, an ISDN digital line or a wireless datalink. Local switching service point 10 receives the dialing, and routes the call onto interexchange carrier 20. The call is routed through interexchange carrier 20 to switching service point 30, which is the local switching service point for telephone line 210. Switch 30 then routes the call to telephone line 211, to which telephone 210 is connected. Under this conventional scenario, the owner of telephone line 111 pays an access fee to the operator of interexchange carrier 20.

However, corporate office 100, in which telephone 110 is located, is also connected to corporate office 200, in which telephone 210 resides, by packet network 40. Data may be sent between computers, such as computer 130 and email server 140, through router 150, onto network 40, to corporate office 200. Similarly, corporate office 200 routes data through router 250, to and from server 240 and computer 230. Since data networks such as network 40 are commonly already required and in place for inter-office data communications, the company of FIG. 1 could avoid the payment of access fees to interexchange carrier 20 by also routing telephone calls over packet network 40.

Under a packet network scenario, the user of telephone 110 places a call on line 111, which is routed into switch 10. Switch 10 references an internal database, as is known in the art, and determines that the target telephone 210 is accessible over the packet network. The telephone call is then switched onto Integrated Services Digital Network ("ISDN") Primary Rate Interface ("PRI") 11, for routing to Gateway 120. Gateway 120 serves as an interface between the switched telephone network, and IP-based network 125, as is known in the art. The call is then routed through Gateway 120 onto IP-based network 125, to router 150.

The call passes through router 150, onto network 40 for transmission to corporate office 200. The call data is received by second corporate office router 250, and routed onto IP-based local area network 225. The call data reaches destination gateway 220, and is routed onto ISDN PRI 31 and into local switch 30. Local switch 30 then connects the call with telephone line 211, for reception at telephone 210. Accordingly, the call between telephone 110 and telephone 210 can be completed over existing data networks, and the payment of an access fee to the provider of interexchange carrier 20 is avoided.

However, under conventional packet networks, the QOS of the communications link between gateway 120 and gateway 220 for the above-mentioned telephone call is not guaranteed. Therefore, during periods of high network traffic and congestion due to the sharing of the network with other users, the QOS may fall below a level acceptable for the subject telephone call. Because many users cannot afford to suffer poor QOS during telephone calls, such conventional packet networks are typically not acceptable alternatives to the conventional switched circuit concatenation of switch 10, IXC 20, and switch 30.

Therefore, the network of FIG. 1 provides for communications with guaranteed QOS. Various methods of ensuring specific QOS parameters already exist, and others are being developed, which depend upon several network-specific factors, including whether network 40 is a frame relay, ATM, or IP link. Such lower-layer techniques are known in the art, and are not the direct subject of this invention.

Because network 40 is typically owned and operated by a third party service provider, a company must still pay for use of network 40. Because guaranteeing a specific level of QOS necessarily involves prioritizing guaranteed communications over non-guaranteed network traffic in times of network congestion, service providers may provide a rate schedule, by which network access cost increases in accordance with level of guaranteed QOS. Therefore, a company can optimize its communications expenditures by reserving only the appropriate QOS level for each call that is made.

In accordance with one embodiment of the invention, a method is provided for assigning QOS guarantees to telephone calls made over a packet network. In the preferred embodiment of FIG. 1, a default QOS level is assigned to line 111, which level is stored in a user profile database in switch 10. When a call is directed to telephone line 211 by the user of telephone 110, switch 10 determines that the call can be routed over the packet network, and routes the call to gateway 120, transmitting therewith the default QOS parameters recalled from the user profile database. Gateway 120 interfaces the call between ISDN PRI and IP-based network 125, and sets up the guaranteed QOS for the call, according to an appropriate QOS protocol.

For example, if the IP network utilizes a resource reservation protocol ("RSVP") to manage QOS requirements for individual application sessions, gateway 120 may send out a PATH message through the network to gateway 220, which message specifies to routers 150 and 250 the type of data that the call will consist of, and the default QOS parameters for line 111, which are required for the transmission stream. Gateway 220 then responds with a RESV message, which message returns to gateway 120 through routers 250 and 150. The resource reservation is incorporated into routers 250 and 150 as the RESV message passes back through, and an end-to-end reservation is established.

However, some callers will require a higher QOS for certain calls. Therefore, dial code QOS selection is provided, whereby a user can select a particular QOS for a call that differs from the default QOS assigned to the line from which the call is placed. For example, a corporate vice-president may wish to utilize a very high QOS to conduct important business negotiations with a customer or another executive, for which the network resource cost of a high QOS guarantee is appropriate. By contrast, a mail clerk placing a call to order additional office supplies may utilize a lower, and therefore less costly, QOS.

In accordance with a preferred embodiment of the dial code QOS function, the user of telephone 110 dials a personal QOS request code before dialing the destination telephone number corresponding to line 211. In one embodiment, the dial code may begin with the "#" digit include a 6 digit personal ID and/or security code, and terminate with a seventh digit corresponding to the relative requested QOS, ranging from zero for the lowest quality to 9 for the highest. However, as would be known to one of skill in the art, many dial code formats could be utilized to signify the desired QOS for a given call. Moreover, while the above-described embodiment involves the manual entry of a QOS request code, the QOS request code may be transmitted automatically by a preprogrammed call initiating device, and/or transmitted digitally by a device initiating a communication over a digital connection such as an H.323 link.

Switch 10 receives the call and determines that the call should be placed over the packet network. In one embodiment, switch 10 evaluates the QOS request code by comparing the dialed value to stored values within the switch user profile database. If the request code is valid, switch 10 routes the call and the requested QOS requirement to gateway 120. Gateway 120 then proceeds to initiate the call onto packet network 125, with the user's requested QOS parameters, according to the previously described sequence of events, which sequence is known in the art. If the request code is not valid, switch 10 may route the call to gateway 120, with default QOS parameters corresponding to line 111.

In another embodiment, default QOS levels and QOS request codes may be stored in a database within the gateway, instead of in a data base within the switch. In such an embodiment, each call, and any QOS request, is routed from telephone line 111 to gateway 120 through switch 10 and ISDN PRI 11, by techniques known in the art. Then, gateway 120 evaluates the dial code according to a user profile database stored within the gateway. The gateway sets up the call with either the requested QOS parameters if the dial code is valid, or the default QOS parameters for the originating line if the dial code is invalid, according to the previously described method for completing a call guaranteed QOS parameters.

When traffic on the packet network is high, sufficient network resources may not be available to guarantee the requested QOS parameters. In such a circumstance, switch 10 may alert the user of telephone 110 via, for example, a voice announcement, that the requested QOS is not available. The network may then provide a number of call routing options to the user, including the options to route the call at a lower guaranteed QOS level, route the call over a circuit-switched network, or hold until sufficient network resources become available to route the call over the packet network at the requested QOS level.

Another aspect of the invention involves a destination line QOS override feature. With destination line override, the recipient of a call can force higher guaranteed QOS parameters for each call that is received thereto. For example, voice mail systems may require a minimum QOS for accurate and reliable touch tone DTMF digit detection, which is commonly used to navigate and control such systems. Therefore, every call placed to the voice mail system should be placed with the appropriate minimum QOS parameters to permit reliable operation of the system, regardless of the QOS demanded by the originating line. The destination line override feature provides for this. The destination line override feature could also be desirable in applications such as the provision of incentives or benefits for preferred customers by businesses. For example, voice and/or data communications initiated by preferred customers could be prioritized by automatically upgrading the call to a higher quality of service level, while communications initiated by unknown or nonpreferred customers would be completed at a lower level.

Figure 2:
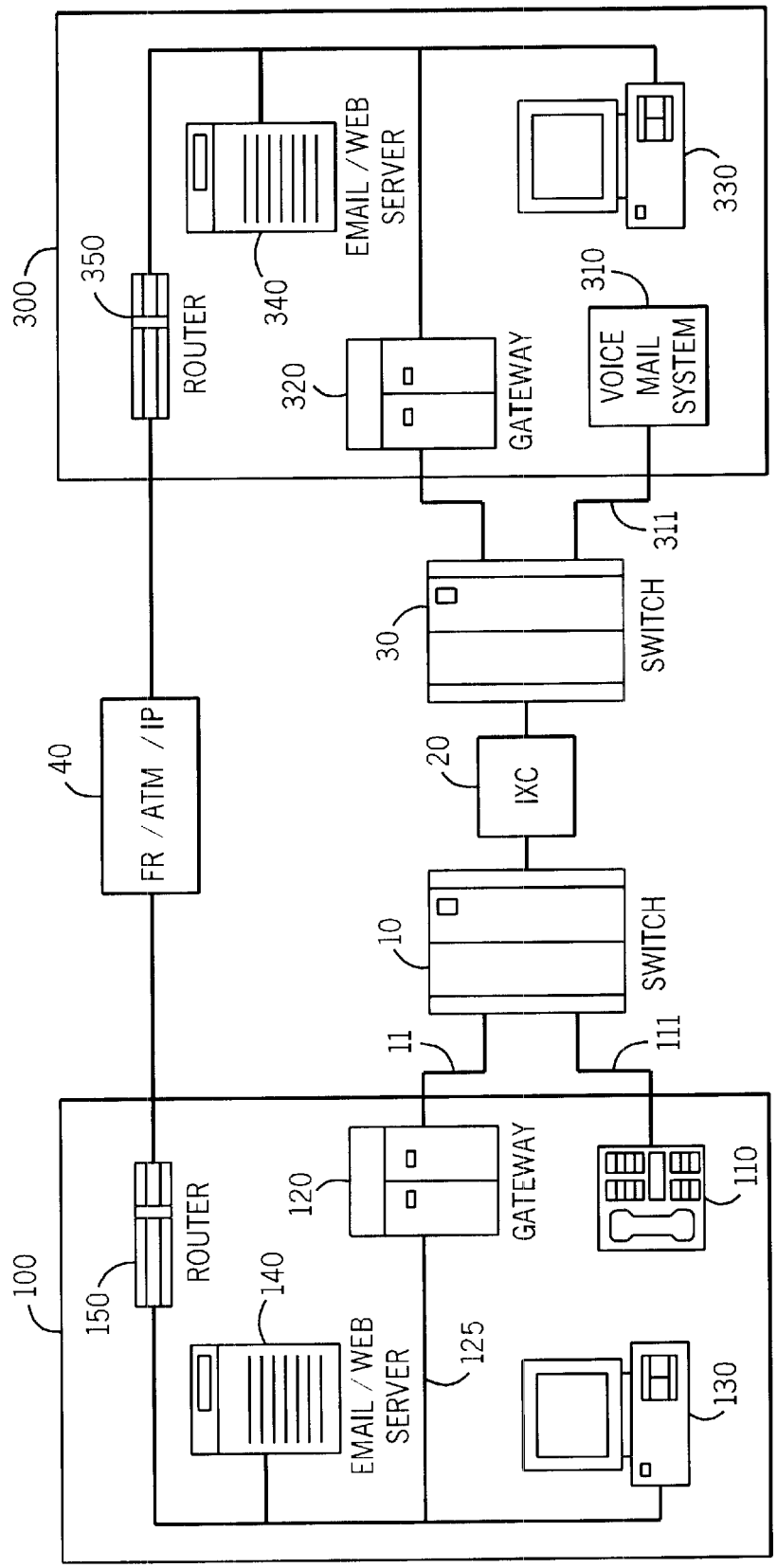
FIG. 2 is a block diagram of another embodiment of the invention, with which all calls placed to a voice mail system over a packet network satisfy predetermined minimum QOS parameters.

FIG. 2 depicts an embodiment of a telecommunications system in which the destination override feature can be implemented. Telephone 110 is used to call voice mail system 310 at telephone line 311, which call requires a predetermined minimum QOS for reliable operation of the voice mail system. Switch 10 determines that the call to voice mail system 310 can be routed over the packet network, and connects line 111 via PRI 11 to gateway 120. Switch 10 also conveys the QOS parameters corresponding to line 111 to gateway 120. Gateway 120 then requests the call setup, as previously described, with a guaranteed QOS corresponding to the default QOS of line 111.

However, when the call reaches switch 30, switch 30 determines that its user profile database specifies predetermined minimum QOS parameters for all calls received by line 311. If the QOS with which gateway 120 initiated the call is lower than the line 311 predetermined minimum QOS, then switch 30 initiates the reservation of higher end-to-end guaranteed QOS parameters for the call corresponding to the line 311 predetermined minimum parameters, according to one of the aforementioned techniques known in the art for guaranteeing QOS on a packet-based network. Therefore, each call placed to voice mail system 310 will have at least the minimum QOS required for reliable operation.

As with the dial code QOS request feature, it is contemplated that destination line override QOS parameters could also be stored within a subscriber profile database in the gateway—particularly, gateway 320 in the embodiment of FIG. 2. Accordingly, in such an embodiment, gateway 320 determines whether the received call is being set up with QOS parameters sufficient to satisfy the line 311 minimums, and initiates the reservation of sufficient QOS guarantees if the initial parameters are insufficient.

Moreover, the override QOS parameters may also be contingent upon the identity of the calling party. This aspect can be implemented in the embodiment of FIG. 2 by identifying the calling party according to techniques known in the communications art. Gateway 320 then determines whether the call is being set up with QOS parameters sufficient to satisfy minimum quality of service levels associated with the identified calling party, and initiates reservation of sufficient QOS guarantees if the initial parameters are insufficient.

The foregoing description and drawings merely explain and illustrate the invention and the invention is not limited thereto except insofar as the appended claims are so limited, inasmuch as those skilled in the art, having the present disclosure before them will be able to make modifications and variations therein without departing from the scope of the invention.

I claim:

1. A method for specifying one or more minimum quality of service parameters for a call placed from a first telephone line, having default minimum required quality of service parameters for calls placed therefrom, to a second telephone line, which call is routed over a packet-based network having the default minimum required quality of service parameters for calls placed on the first telephone line, the method comprising the steps of:
   receiving a QOS request code on the first telephone line, which QOS request code specifies a desired quality of service requirement with associated minimum quality of service parameters different from the default parameters;
   determining applicable minimum required quality of service parameters with which the call should be routed;
   placing the call on the first telephone line;
   routing the call over the packet-based network between the first and second telephone lines with the call quality of service at least satisfying the applicable minimum required quality of service parameters;
   wherein the step of determining the applicable minimum required quality of service parameters is comprised of the substeps of:
      determining that sufficient resources are not available on the packet network to route the call with the requested minimum quality of service parameters;
      querying on the first telephone line whether the call should be routed with guaranteed quality of service parameters lower than those requested for which sufficient packet network resources are presently available, or the call should be delayed until sufficient network resources are available to route the call with the requested quality of service parameters;
      implementing quality of service parameters according to the query response.

2. The method of claim 1, in which the step of determining the applicable minimum required quality of service parameters is comprised of the substeps of: checking whether the QOS request code is valid;
   implementing the quality of service parameters corresponding to the QOS request code if the QOS request code is valid.

3. The method of claim 2, in which the step of determining the applicable minimum required quality of service parameters further includes the substep of:
   implementing the default quality of service parameters associated with the first telephone line if the QOS request code is not valid.

4. The method of claim 2, in which the substep of checking whether the QOS request code is valid is further comprised of the substeps of:
   storing a list of predetermined valid request codes;
   determining that the QOS request code is valid if it is contained within the list of predetermined valid request codes.

5. The method of claim 2, in which the substep of checking whether the QOS request code is valid is further comprised of the substeps of:
   specifying a predetermined formula to which valid request codes must comply;
   determining that the QOS request code is valid if it conforms to the predetermined formula.

6. The method of claim 1, in which the step of determining the applicable minimum required quality of service parameters is comprised of the substeps of:
   implementing quality of service parameters corresponding to a level of service for which network resources are available to route the call.

7. The method of claim 1, in which the step of determining the applicable minimum required quality of service parameters is comprised of the substeps of:
   implementing the quality of service parameters corresponding to the QOS request code.

8. A method for specifying one or more quality of service parameters for a telephone call placed from a first telephone line to a second telephone line, which call is routed over a packet-based network, the method comprising the steps of:
   determining a set of override quality of service parameters for use in conjunction with calls directed to the second telephone line;
   placing a call on the first telephone line, which call specifies a first set of quality of service parameters and is directed to the second telephone line;
   determining that one or more of the first set of quality of service parameters is of a lower quality level than the level specified by the corresponding override quality of service parameters;
   identifying the first telephone line from which the call to the second telephone line is received;
   determining whether the override quality of service parameters should be applied to the call based upon the identification of the first telephone line from which the call is received; and
   routing the call between the first telephone line and the second telephone line via the packet-based network according to the applicable quality of service parameters.

9. The method of claim 8, which method further includes the step of routing the call between the first telephone line and the second telephone line via the packet-based network with quality of service parameters at least equal to the override quality of service parameters.

* * * * *